March 23, 1965         H. A. MACKIE         3,174,809

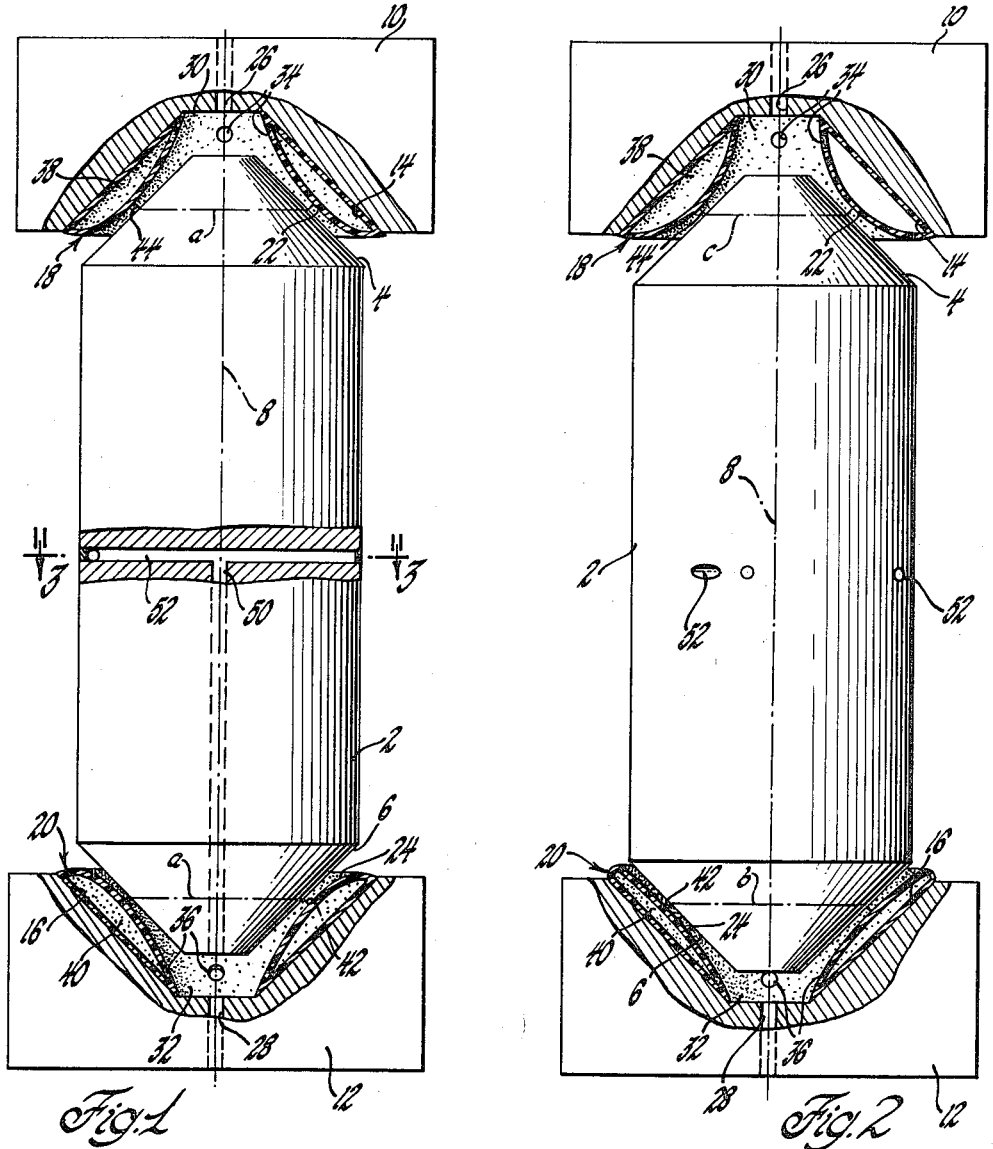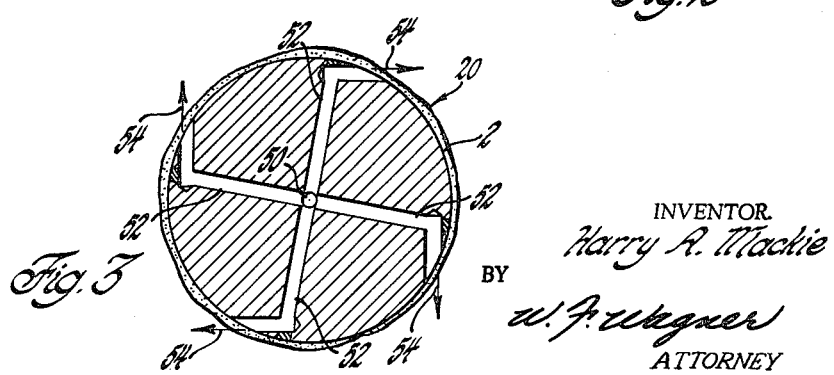

SELF-CENTERING RADIAL AND THRUST LOAD AIR BEARING

Filed April 30, 1963         2 Sheets-Sheet 2

INVENTOR.
Harry A. Mackie
BY
W. F. Wagner
ATTORNEY

United States Patent Office 3,174,809
Patented Mar. 23, 1965

3,174,809
SELF-CENTERING RADIAL AND THRUST LOAD
AIR BEARING
Harry A. Mackie, Birmingham, Mich., assignor to General
Motors Corporation, Detroit, Mich., a corporation of
Delaware
Filed Apr. 30, 1963, Ser. No. 276,710
11 Claims. (Cl. 308—9)

This invention relates to air bearings and more particularly to an air bearing assembly incorporating means for resisting spindle displacement resulting from unbalanced radial and thrust loads.

An object of the invention is to provide an improved air bearing assembly.

A further object is to provide an air bearing assembly of the type wherein the spindle is supported entirely on a fluid cushion.

Another object is to provide a device of the stated character wherein the fluid cushion is formed and arranged in such a way as to resist both axial and radial displacement of the spindle during rotation thereof.

Yet a further object is to provide a bearing assembly of the type described wherein the spindle is formed at opposite ends with generally conical bearing surfaces disposed adjacent support means having annular recesses therein arranged concentrically with and spaced from the bearing surfaces with flexible annular chambers mounted in the recesses adjacent the bearing surfaces, the chambers being arranged in communication with the interior of the recesses so that upon introduction of superatmospheric pressure in the latter, corresponding superatmospheric pressure is introduced into the chambers causing deflection thereof to form curved wall portions having a line of optimum proximity to the conical bearing surfaces establishing a throttling gap which meters the flow of air from the recess and thereby establishes a superatmospheric cushion rotatably supporting said spindle both axially and radially.

Yet another object is to provide a bearing assembly of the type described wherein axial displacement of the spindle causes the throttling gap to shift in the axial opposite direction and increase the effective area of the superatmospheric cushion to thereby restore the initial axial position of the spindle.

A still further object is to provide a bearing assembly of the type described wherein radial displacement of the spindle induces an unsymmetrical variation in the curved cross section of the wall which shifts the throttling gap from a plane perpendicular to the axis of the spindle to an inclined position opposing the direction of radial displacement, thereby establishing an unbalanced couple tending to restore the spindle to the normal axis of rotation.

Still another object is to provide a device of the type described including turbine means formed in the spindle energized by superatmospheric pressure derived from the cushioning means.

These and other objects, advantages and features of the invention will become more fully apparent as reference is had to the accompanying specification and drawings wherein:

FIGURE 1 is an elevational view, partly in section and with parts broken away, illustrating an air bearing device in accordance with the invention, with the various parts being shown in the normal operating relationship;

FIGURE 2 is a view similar to FIGURE 1, illustrating the relationship of the parts under conditions of unbalanced axial load;

FIGURE 3 is a sectional view looking in the direction of arrows 3—3 of FIGURE 1;

Figure 4:
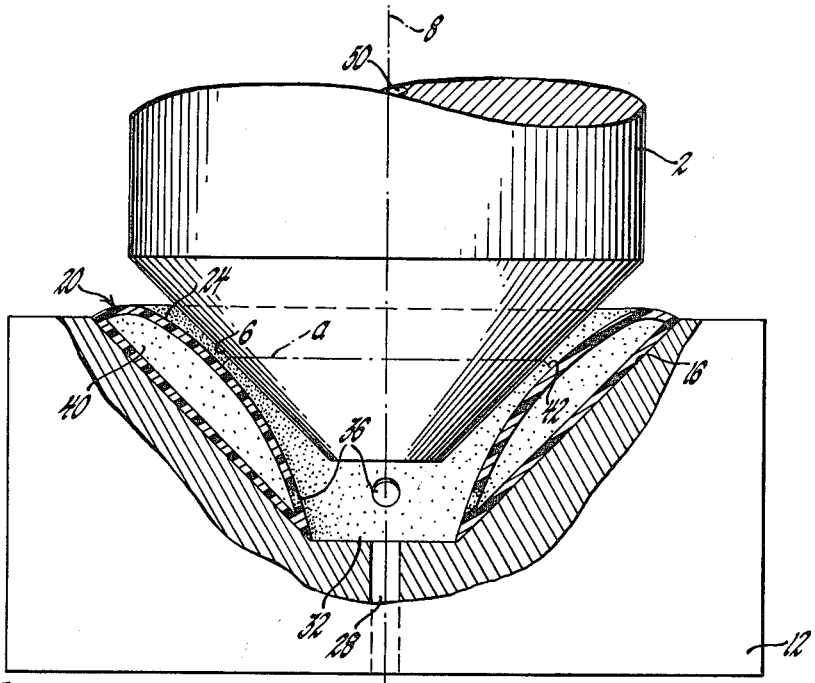
FIGURE 4 is a greatly enlarged fragmentary view of one end of the device shown in FIGURES 1 and 2, illustrating the space relation of the parts under normal operating conditions.

Referring now to the drawings and particularly FIGURE 1, there is shown an air bearing assembly in which the reference numeral 2 designates a rotatable spindle having generally conical bearing surfaces 4 and 6 generated at opposite ends thereof about the spin axis 8. Disposed in concentric relation with and surrounding each conical bearing portion are supports 10 and 12 having generally conical recesses 14 and 16 formed therein which under normal operating conditions are concentric with bearing portions 4 and 6 and spin axis 8. Secured to the surfaces of conical recesses 14 and 16 are hollow annular flexible members 18 and 20, each of which includes radially inwardly facing curved walls 22 and 24 which lie adjacent bearing surfaces 4 and 6. Formed centrally in supports 10 and 12 are ports 26 and 28 through which superatmospheric air from a suitable source is introduced into the plenum chambers 30 and 32 formed between conical ends 4 and 6 and supports 10 and 12. At circumferentially spaced intervals, curved walls 22 and 24 are formed with a plurality of apertures 34 and 36 through which superatmospheric air from plenums 30 and 32 enters annular chambers 38 and 40 formed within members 18 and 20.

According to the principal feature of the invention, upon introduction of fluid pressure at opposite ends of the assemblies in the manner just described, annular chambers 38 and 40 inflate and cause members 18 and 20 to assume a generally air foil shaped cross section. As shown best in FIGURE 4, the curved wall 24 of member 20 establishes a circle of optimum proximity to the conical bearing surface 6 about an imaginary circle a lying in a plane perpendicular to the spin axis 8 of spindle 2. As a result, there is formed a circular throttling gap 42 which restricts the flow of superatmospheric pressure from plenum 32 to atmosphere, thereby establishing a superatmospheric cushion having effective area approximately equal to the cross sectional area of the circle a. In consequence, the spindle is supported in frictionless normally concentric relation with support 12. Naturally, the same conditions obtain with respect to the opposite end of the spindle and support 10.

As seen best in FIGURE 2, under conditions tending to impose unsymmetrical axial loading on spindle 2, for example in a downward direction, the conical surface 4 moves downwardly away from support 10, while conical surface 6 moves downwardly toward the bearing support 12. As a result, flexible walls 18 and 20 undergo change in cross sectional configuration such that the throttling gap 44 between wall 18 and surface 4 defines a reduced diameter, while the throttling gap 42 between wall 20 and surface 6 defines an enlarged diameter. Consequently, the effective area of the superatmospheric cushion at the end of the spindle toward which the axial load is imposed becomes greater, while the effective area at the opposite end diminishes correspondingly and the unbalance of reaction afforded by the two effective areas tends to restore the spindle to its normal axial position between the supports 10 and 12 whereupon the effective areas at the throttling gap again become equal.

Figure 5:
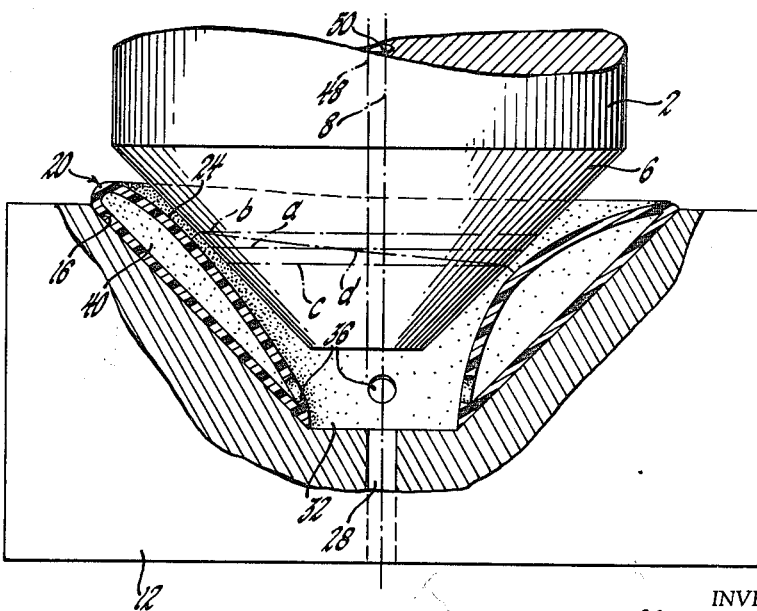
FIGURE 5 is a view similar to FIGURE 4, showing the spatial relationship of the parts when the bearing spindle is subjected to unbalanced radial load.

As seen best in FIGURE 5, under conditions of unbalanced radial load, the spin axis 8 of spindle 2 tends to move from a position of concentricity with support 12 to a displaced position 48 with the result that conical bearing surface 6 is caused to assume an eccentric position relative to recess 16. As an incidence of such displacement, the portion of curved wall 18 facing the direction of displacement of spindle 2 changes in configuration so that the throttling gap moves upwardly to the level of an imaginary circle b, while the portion of curved wall 18 at the side opposite the direction of spindle displacement moves downwardly to the level of an imaginary circle c. The net result of such change in cross sectional configuration is to produce a progressive variation in cross section between the two extremes and thereby define a throttling gap lying in the plane of imaginary circle d which is inclined with respect to spin axis 8 in a direction opposing displacement thereof to 48. Accordingly, an unbalanced couple is established relative to conical surface 6 which tends to restore the spindle spin axis 8 to concentricity with support 12 and of course restore the cross sectional configuration of curved wall 20 to the condition shown in FIGURE 4.

According to another feature of the invention, as seen best in FIGURES 1 and 3, means are provided for imparting rotation to spindle 2 wherein superatmospheric pressure derived from plenum 32 enters an axial bore 50 formed in the spindle. Bore 50 in turn communicates with a plurality of radially extending curved passages 52 having lines of emission 54 generally tangent to the circumference of the spindle 2. Inasmuch as the spindle is frictionlessly supported, relatively moderate air consumption is required to impart rotation to the spindle. Naturally, corresponding pressure may be provided in communication with plenum 30, if desired.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:
1. In an air bearing assembly, a rotating member having a generally conical bearing surface, a support formed with an annular recess normally concentric with and axially spaced from said bearing surface, a flexible diaphragm secured to and extending around the circumference of said recess forming a wall of curved cross section adjacent said conical bearing surface, and means for establishing and maintaining substantially corresponding fluid pressure in the space between said curved wall and said recess and the space between said recess and said member bounded by said curved wall.

2. An air bearing assembly comprising, a rotating member having a generally conical bearing surface, a support formed with a generally conical recess normally concentric with and axially spaced from said bearing surface, a flexible diaphragm secured to and extending around the circumference of said recess forming a wall of curved cross section adjacent said conical bearing surface, and means for establishing and maintaining substantially corresponding fluid pressure in the space between said curved wall and said recess and the space between said recess and said member bounded by said curved wall.

3. An air bearing assembly comprising, a rotating member having a generally conical bearing surface, a support formed with an annular recess normally concentric with and axially spaced from said bearing surface, a flexible diaphragm secured to and extending around the circumference of said recess forming a wall of curved cross section adjacent said conical bearing surface, passage means in said support for introducing fluid under pressure into the space between said rotating member and said support, and means for introducing substantially corresponding fluid pressure into the space between said curved wall and said recess.

4. In an air bearing assembly, a rotating member having a generally conical surface of revolution, a support having a generally conical recess normally concentric with and axially spaced from said surface of revolution, means defining an inflatable chamber around the surface of said recess including a flexible wall of curved cross section lying adjacent said surface of revolution, and means for inducing substantially corresponding fluid pressure in said chamber and the space between said rotating member and said support bounded by said flexible wall.

5. In an air bearing assembly, a rotatable member having a generally conical surface of revolution, a support having a recess normally concentric with and axially spaced from said surface of revolution and including an inflatable annular chamber having a flexible wall of curved cross section lying adjacent said surface of revolution, said curved wall cooperating with said surface of revolution to define a uniform minimum circular clearance therebetween, and means for establishing and sustaining substantially corresponding fluid pressure in said chamber and the space between said rotating member and said support bounded by said minimum clearance.

6. In combination, a rotating member having a surface of revolution generated in inclined relation to the axis of rotation thereof providing a compound radial and thrust load absorbing surface, a support having a recess surrounding said surface of revolution and spaced radially and axially therefrom, an annular chamber formed on the wall of said recess, said chamber including a flexible wall of curved cross-section disposed adjacent said surface of revolution defining a minimum circular clearance therebetween, means for inducing substantially corresponding fluid pressure in said chamber and the space between said member and said recess bounded by said minimum circular clearance to frictionlessly support said member for rotation concentric with said recess.

7. In combination, a rotating member having a surface of revolution generated in inclined relation to the axis of rotation thereof providing a compound radial and thrust load absorbing surface, a support having a recess surrounding said surface of revolution and spaced radially and axially therefrom, an annular chamber formed on the wall of said recess, said chamber including a flexible wall of curved cross section disposed adjacent said surface of revolution defining a minimum clearance therebetween, means for inducing substantially corresponding fluid pressure in said chamber and the space between said member and said recess bounded by said minimum circular clearance to frictionlessly support said member for rotation concentric with said recess, whereby said minimum circular clearance lies in a plane perpendicular to said axis of rotation under conditions of balanced radial load on said member and progressively inclined relative to said axis in opposition to unbalanced radial load on said member, thereby providing an unsymmetrical force tending to restore the axis of said member to a position of concentricity with said support.

8. In an air bearing assembly, a rotatable member having a generally conical surface of revolution, a support having a recess normally concentric with and axially spaced from said surface of revolution and including an inflatable annular chamber having a flexible wall of curved cross section lying adjacent said surface of revolution, said curved wall cooperating with said surface of revolution to define a uniform minimum circular clearance therebetween, and means for inducing and sustaining substantially corresponding fluid pressure in said chamber and the space between said rotating member and said support bounded by said minimum clearance, said minimum clearance forming a throttling gap providing restricted flow of fluid from said space, whereby said member is rotatably frictionlessly supported on a cushion of superambient fluid pressure.

9. In an air bearing assembly, a rotatable member having a generally conical surface of revolution, a support having a recess normally concentric with and axially spaced from said surface of revolution and including an inflatable annular chamber having a flexible wall of curved cross section lying adjacent said surface of revolution, said curved wall cooperating with said surface of revolution to define a uniform minimum circular clearance therebetween, and means for inducing and sustaining substantially corresponding fluid pressure in said chamber and the space between said rotating member and said support bounded by said minimum clearance, said minimum clearance forming a uniform throttling gap providing restricted flow of fluid from said space, whereby said member is rotatably frictionlessly supported on a cushion of superambient fluid pressure, said wall being yieldably responsive to radial displacement of said member to maintain said uniform gap, whereby the plane of said gap is caused to shift angularly opposite to the direction of radial displacement and produce an unbalanced couple tending to restore concentricity between said member and said recess.

10. In an air bearing assembly, a rotatable member having a generally conical surface of revolution, a support having a recess normally concentric with and axially spaced from said surface of revolution and including an inflatable annular chamber having a flexible wall of curved cross section lying adjacent said surface of revolution, said curved wall cooperating with said surface of revolution to define a uniform minimum circular clearance therebetween, and means for inducing and sustaining substantially corresponding fluid pressure in said chamber and the space between said rotating member and said support bounded by said minimum clearance, said minimum clearance forming a uniform throttling gap normally lying in a plane perpendicular to the axis of rotation of said member, whereby said member is rotatably frictionlessly supported on a cushion of superambient fluid pressure, said wall being yieldably responsive to radial displacement of said member to maintain said uniform gap, whereby the plane of said gap is caused to shift angularly opposite to the direction of radial displacement and produce an unbalanced couple tending to restore concentricity between said member and said recess.

11. In an air bearing assembly, a rotatable member having a generally conical surface of revolution, a support having a recess normally concentric with and axially spaced from said surface of revolution and including an inflatable annular chamber having a flexible wall of curved cross section lying adjacent said surface of revolution, said curved wall cooperating with said surface of revolution to define a uniform minimum circular clearance therebetween, and means for inducing and sustaining substantially corresponding fluid pressure in said chamber and the space between said rotating member and said support bounded by said minimum clearance, said minimum clearance forming a uniform throttling gap normally lying in a plane perpendicular to the axis of rotation of said member, whereby said member is rotatably frictionlessly supported on a cushion of superambient fluid pressure, said wall being variably yieldable in cross section responsive to radial displacement of said member to maintain said uniform gap, whereby the plane of said gap is caused to shift angularly opposite to the direction of radial displacement and produce an unbalanced couple tending to restore concentricity between said member and said recess.

References Cited by the Examiner
UNITED STATES PATENTS

| 1,425,979 | 8/22 | Kingsbury | 308—60 |
| 3,065,460 | 11/62 | Altenau et al. | 308—9 |

FRANK SUSKO, *Primary Examiner*.